United States Patent [19]

Martineau

[11] Patent Number: 5,536,392
[45] Date of Patent: Jul. 16, 1996

[54] FLUID CATALYTIC CRACKING

[76] Inventor: André Martineau, 488 The Kingsway, Islington, Ontario, Canada, M9A 3W6

[21] Appl. No.: 152,104

[22] Filed: Nov. 15, 1993

Related U.S. Application Data

[63] Continuation of Ser. No. 699,508, May 6, 1991, abandoned.

[51] Int. Cl.$^6$ ........................................... C10G 47/10
[52] U.S. Cl. ........................ 208/113; 208/153; 208/157
[58] Field of Search ................................................ 208/157

[56] References Cited

U.S. PATENT DOCUMENTS

| | | | |
|---|---|---|---|
| 2,786,801 | 3/1957 | McKinley et al. | 196/53 |
| 2,937,988 | 5/1960 | Polack et al. | 208/127 |
| 2,994,659 | 8/1961 | Slyngstad et al. | 208/183 |
| 3,654,140 | 4/1972 | Coriffel et al. | 208/157 |
| 3,674,682 | 7/1972 | Mitchell et al. | 208/157 |
| 4,149,964 | 4/1979 | Bartholic | 208/153 |
| 4,397,738 | 8/1983 | Kemp | 208/161 |
| 4,427,537 | 1/1984 | Dean et al. | 208/120 |
| 4,434,049 | 2/1984 | Dean et al. | 208/153 |
| 4,534,851 | 8/1985 | Allan et al. | 208/68 |
| 4,555,328 | 11/1985 | Krambeck et al. | 208/157 |
| 4,592,506 | 6/1986 | Capes et al. | 239/139 |
| 4,687,642 | 8/1987 | Nielsen | 208/157 |
| 4,692,235 | 9/1987 | Parker et al. | 208/153 |
| 4,713,169 | 12/1987 | Nielsen | 208/157 |
| 4,717,467 | 1/1988 | Haddad et al. | 208/113 |
| 4,728,036 | 3/1988 | Bennett et al. | 239/132 |
| 4,729,825 | 3/1988 | Nielsen | 208/153 |
| 4,793,913 | 12/1988 | Chessmore et al. | 208/153 |
| 4,800,014 | 1/1989 | Harp et al. | 208/157 |
| 4,820,493 | 4/1989 | Haddad et al. | 422/143 |
| 4,883,583 | 11/1984 | Mauleon et al. | 208/152 |
| 5,139,748 | 8/1992 | Lomas et al. | 422/140 |

OTHER PUBLICATIONS

'FCC heat balance critical for heavy fuels' Mauleon et al, Oil & Gas Journal, Oct. 21, 1985.
'Total introduces new FCC process', Dean et al, Oil & Gas Journal, Oct. 11, 1982.
'Resid puts FCC Process in New Perspective', Dean et al, Oil & Gas Journal, Oct. 4, 1982.

*Primary Examiner*—Helane Myers
*Attorney, Agent, or Firm*—Ridout & Maybee

[57] ABSTRACT

In fluid catalytic cracking of oils, the feedstock oil is atomized so that its average particle size relative to the average catalyst particle size is such that most oil particles contacting a catalyst particle will form a film having a thickness substantially less than the boundary layer thickness of the thermal conduction interface between the feedstock oil and the catalyst. A nozzle suitable for producing such atomisation is disclosed. To compensate for reduced formation of coke from the feedstock, and permit riser temperatures to be maintained without overcracking, decant oil or other oil residues containing uncrackable hydrocarbons may be added to the feedstock so as to obtain gasoline fractions having increased octane numbers.

15 Claims, 6 Drawing Sheets

FLUID CATALYTIC CRACKING

This application is a continuation of application Ser. No. 699,508, filed May 6, 1991, abandoned.

BACKGROUND OF THE INVENTION

1. Field of the Invention

This invention relates to the fluid catalytic cracking (FCC) of crude oil fractions to improve the yield of desired products.

2. Review of the Art

Fluid catalytic cracking has long been known as a technique for reforming crude oil fractions so as to improve the yield of useful hydrocarbons and so as to tailor the output of a refinery to provide different types such useful hydrocarbons in proportions appropriate to the demand for such different types of hydrocarbons. Usually the ruling factor in such tailoring is the demand for high octane gasoline fractions, the demand for which has been increased by the phasing out of the use of lead compounds as octane improvers in gasolines.

A number of factors interact in determining the product mix produced by a conventional fluid catalytic cracking unit, including the nature of the feedstock, the activity of the catalyst, and the riser temperature in the cracking unit. There is substantial operational interaction between these factors. For example, an increased riser temperature promotes hydrogen transfer reactions which create cyclic and isomeric molecules which produce improved octane levels in gasoline range fractions. Such an increased riser temperature also promotes the deposition of coke on the catalyst which reduces catalyst activity, and decreases production of desired products. The conditions under which such units operate thus inevitably represent a compromise. The heavier the feedstock the more difficult it becomes to reach a satisfactory compromise.

One approach to providing an improved compromise is to operate the unit in a manner which minimizes any increase in coking reactions as cracking conditions are optimized to produce a desired product mix. Coking reactions can be regarded as a subset of the diverse reactions which can occur on or within catalyst particles during cracking. They are dependent upon the reaction environment and upon the nature of the feedstock being sent to the cracking unit. Coking reactions are dehydrogenation reactions which produce a tar-like oil product and considerable quantities of gas, and represent unwanted cracking reactions which reduce the yield of wanted products and foul the catalyst.

The ideal environment for such coking reactions is a liquid phase at approximately 425° C., in the substantial absence of catalytic activity. These are the conditions which exist at the surface of a catalyst particle in contact with liquid feedstock prior to vaporization of the latter. Catalytic cracking on the other hand is ideally a vapour phase reaction in which individual oil molecules enter pores in the catalyst and reach active sites which promotes hydrogen transfer reactions leading to cracking of the molecule. The actual cracking reactions produce little or no coke for most molecules capable of entering the catalyst pores, but instead tend to produce molecules in the $C_6$-$C_{15}$ range. In order to maximize cracking and minimize coke formation, the oil feedstock should thus be vaporised as rapidly as possible.

In an article 'FCC heat balance critical for heavy fuels' by J. L. Mauleon and J. C. Courcelle, Oil and Gas Journal, Oct. 21, 1985, pages 64 et seq., the authors discuss the interaction of these and other factors, and at page 65 provide a table illustrating the theoretical relationship between oil droplet size and vaporization time, for oil droplet sizes of 500, 100 and 30 microns. It will also be noted that as droplet size decreases, the decrease in vaporization time as shown in the table is initially very great for the change from 500 to 100 microns, but much less for the further decrease from 100 to 30 microns. This may be related to the vaporization mechanism. With large oil particles, individual catalyst particles do not have sufficient thermal capacity fully to vaporize an oil particle. As the heat required to vaporize an oil particle decreases relative to the thermal capacity of the catalyst particles, the vaporization time initially drops very rapidly. The table given in the article appears to have been constructed upon the hypothesis that once the heat of vaporization of the oil particles is small relative to the thermal capacity of the catalyst particles, the rate of vaporization remains primarily controlled by boundary layer effects so that little further improvement is obtained. In brief, a boundary layer (which may be defined as that layer within which 99% of the temperature difference between the oil and the catalyst occurs) of liquid in immediate contact with the catalyst particle vaporizes, and the vapour produced inhibits conductive heat transfer to the remainder of the liquid, so that the primary heat transfer mechanism is convection within the liquid phase. On this hypothesis, once the particle size of the oil droplets becomes small enough that most of the oil particles are sufficiently small relative to the catalyst particles that a typical single catalyst particle has sufficient thermal capacity to vaporize a typical single oil particle, there is little advantage in further oil particle size reduction.

It can be calculated that the amount of energy contained in a catalyst particle will be capable of providing an oil particle of between 40 and 55 microns with enough energy to vaporize it. The exact size of the oil particle which can be vaporized will vary with the temperature of the oil and catalyst, as well as the thermal properties of both. In most cases, if oil particles have a diameter of less than 40 microns, a single catalyst particle will have the necessary thermal capacity to vaporize an oil particle.

Processes in which reduction towards this level of oil particle size are effected to improve vaporization time and reduce coking have been proposed and implemented. Thus in two further articles, in Oil and Gas Journal, "Total introduces new FCC process" (Oct. 11, 1982) and "Resid puts FCC process in new perspective" (Oct. 4, 1982) both by Robert Dean, J. L. Mauleon and Warren Letzsch, such a process is discussed, although no specifics of particle size are disclosed. More details of certain aspects of the process and apparatus are to be found in U.S. Pat. Nos. 4,427,537 and 4,434,049 issued to Dean et al. These patents disclose an FCC process in which the oil is atomized to form droplets ranging in size between 10 and 500 microns, although the actual size distribution within this range and the average particle size are not discussed.

SUMMARY OF THE INVENTION

I have now discovered a means by which it is entirely practicable to atomize feedstock oil to produce substantially smaller average oil particle sizes than are contemplated in the Dean et al patents discussed above, and that, surprisingly in view of the Mauleon & Courcelle article, a very substantial further improvement in vaporization rate can then be obtained. This is believed to be because most of the particles are now of sufficiently small size that when they impact a catalyst particle they form a film which is thinner than the thermal conductivity boundary layer. This results in the primary heat transfer mechanism between catalyst and oil becoming direct conduction rather than convection, permitting substantially instantaneous vaporization of the bulk of the liquid without the insulation or dispersion effects mentioned above. Assuming typical catalyst particle sizes and FCC operating conditions and temperatures, the average film thickness will equal the boundary layer thickness at a particle size of about 12 to about 18 microns. Whilst beneficial effects are obtained as the average particle size is reduced below about 30 microns, the size is preferably reduced to less than 15 microns or even to less than 10 microns. I have found that this degree of atomization, typically to a mean particle size of 8 microns, can be achieved utilizing an atomising nozzle as disclosed in U.S. Pat. No. 4,728,036 (Bennett et al), which in turn is an improvement upon the atomizing nozzle disclosed in U.S. Pat. No. 4,592,506 (Capes et al). Use of the improved nozzle is preferred because of its greater ease of adjustment and consistency of performance. These nozzles were designed to achieve a high degree of wear resistance in burner assemblies for coal/oil mixtures, and the above two patents, whose disclosures and drawings are incorporated herein by reference, contain nothing to suggest the exceptional atomization performance which they can achieve when used to introduce feedstocks into an FCCU.

A particular advantage of these nozzles is that they require relatively low feed pressures of no more than about 7 atmospheres, a level readily attainable in the environment of a typical FCCU, whereas in earlier experiments of mine with more conventional atomization equipment, atomization to an average particle size below 30 microns could only be obtained by the use of extreme liquid feed pressures and temperatures which required special and expensive equipment. Even then, it was not feasible to obtain an average particle size less than 18 microns (estimated).

In practice, the reduction in coke formation using conventional feedstocks atomized in this manner is so pronounced that effective catalyst activity is markedly increased, with the result that unless riser temperatures are reduced, overcracking may occur with an actual reduction in the production of gasoline fraction hydrocarbons. If the riser temperature is reduced, overcracking can be avoided, but the reduced cracking temperature results in a lowering of the octane number of the gasoline fraction, which may not always be acceptable. The reduction in coke formation also disturbs the heat balance of the system, since less coke is available during catalyst regeneration to heat the latter and provide the heat absorbed by vaporization of the feedstock oil and the cracking reactions themselves.

In a particularly preferred embodiment of the invention, low volatility oil residues having a substantial content of essentially uncrackable hydrocarbons, such as decant oil or vacuum tower bottoms, are added to the feedstock. Because of their low volatility and crackability, such additions tend to form coke, which permits coke formation to be artificially increased. This has the threefold beneficial effect of controlling catalyst activity so that riser temperatures can be raised towards conventional levels, controlling the heat balance of the system, and recovering useful hydrocarbons from low value residues, with substantial economic benefits.

Further features of the invention will become apparent from the following description, in the course of which reference will be had to the accompanying drawings.

IN THE DRAWINGS

DESCRIPTION OF THE PREFERRED EMBODIMENT

The present invention can be incorporated into conventional types of FCCU, including existing plant, and detailed description of such plant is believed unnecessary. Essentially the plant is modified simply by replacing existing oil feed arrangements by nozzles 2, constructed in accordance with U.S. Pat. No 4,728,036. Since such nozzles are fully described in that patent and in U.S. Pat. No. 4,592,506, detailed description is believed unnecessary. In such nozzles, as best seen in FIG. 1A, liquid, in this case oil, to be atomized, is flowed from a supply line 30 in a divergent film over a frustoconical surface of a ceramic core 32 which forms the inner wall of a divergent annular passage through a ceramic nozzle rim 34, into and through which passage a high velocity flow of gas is directed from a supply line 36.

Figure 1:
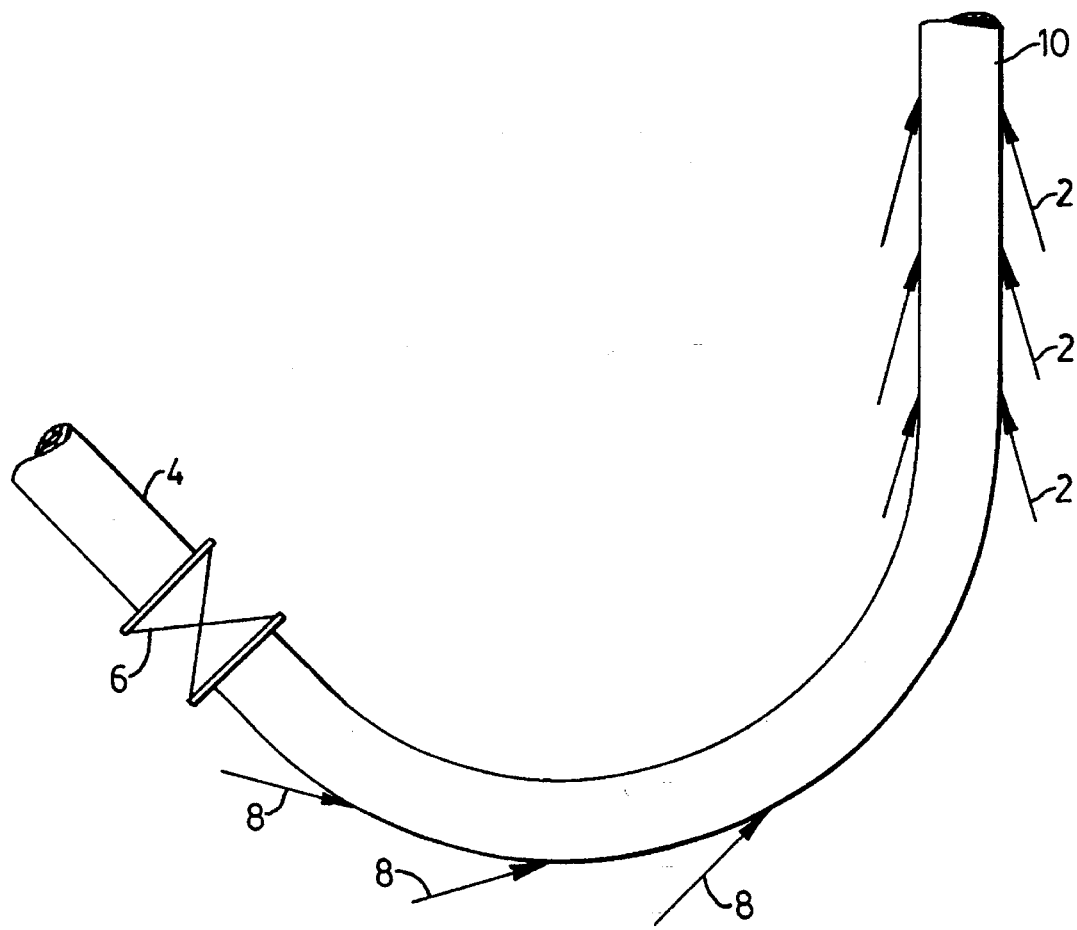
FIGS. 1, 2 and 3 are diagrams of portions of three conventional types of FCCU, as modified to incorporate the invention.
Figure 1A:
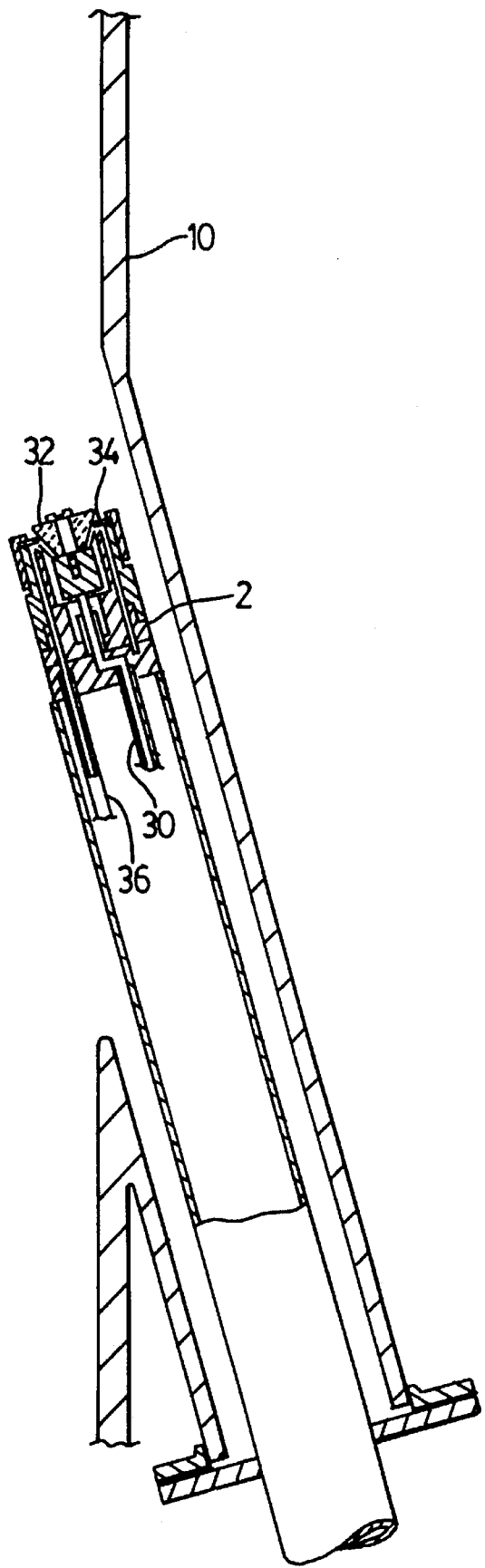
FIG. 1A is a fragmentary enlargement of a part of FIG. 1, showing a single nozzle.
Figure 2:
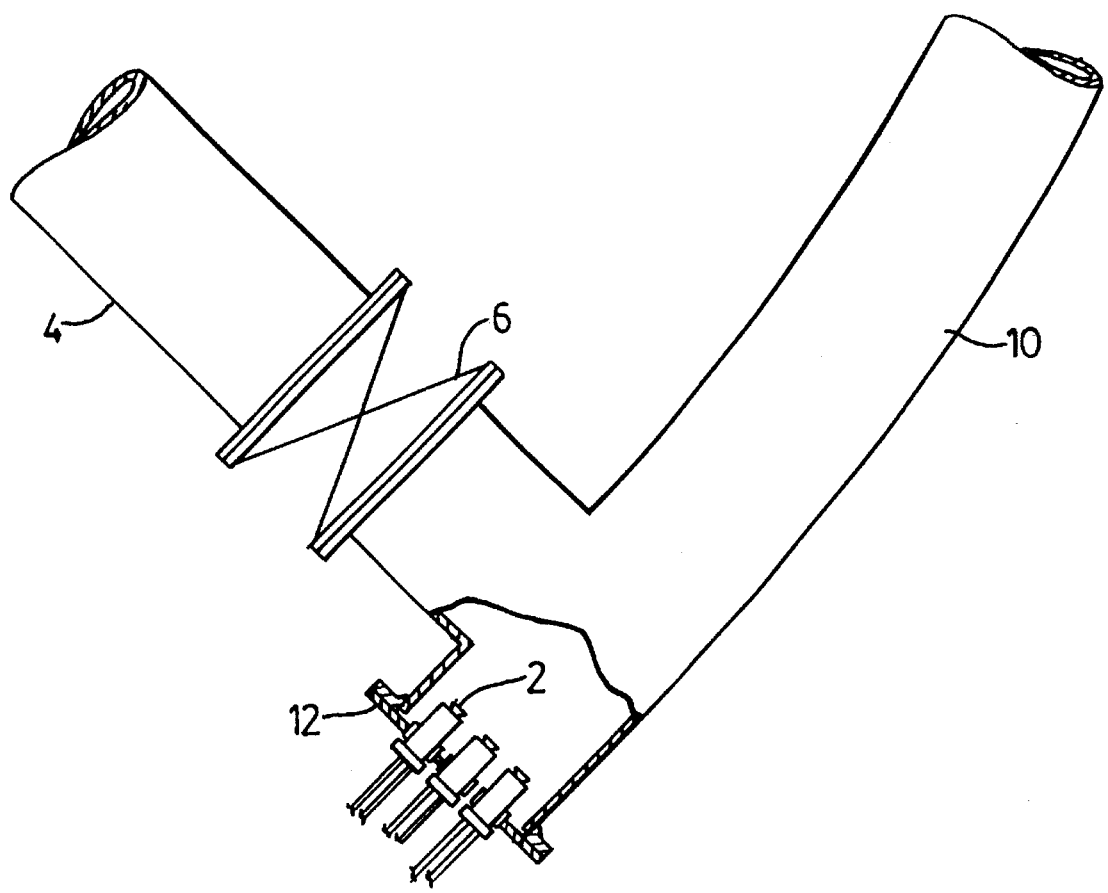
Figure 2A:
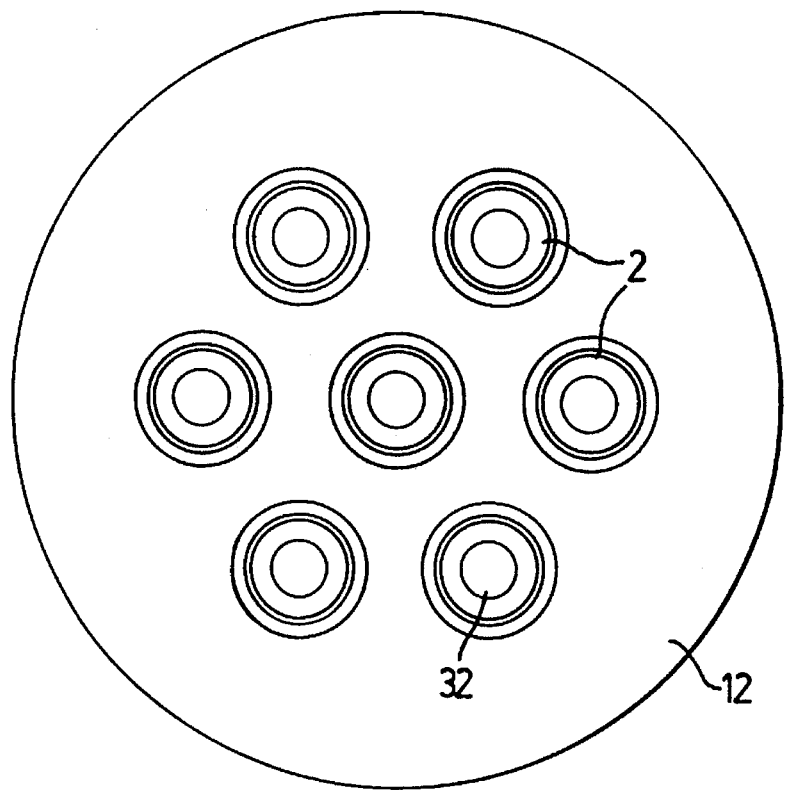
FIGS. 2A and 2B are plan and cross-sectional views of the nozzle assembly shown in FIG. 2.
Figure 2B:
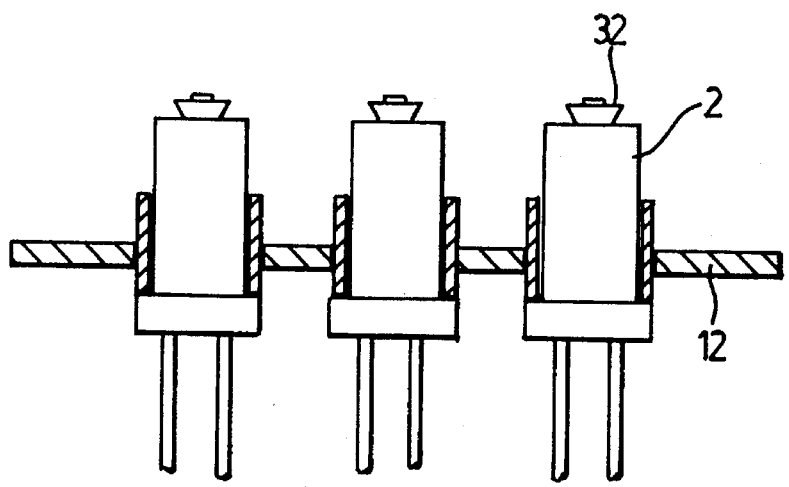
Figure 3:
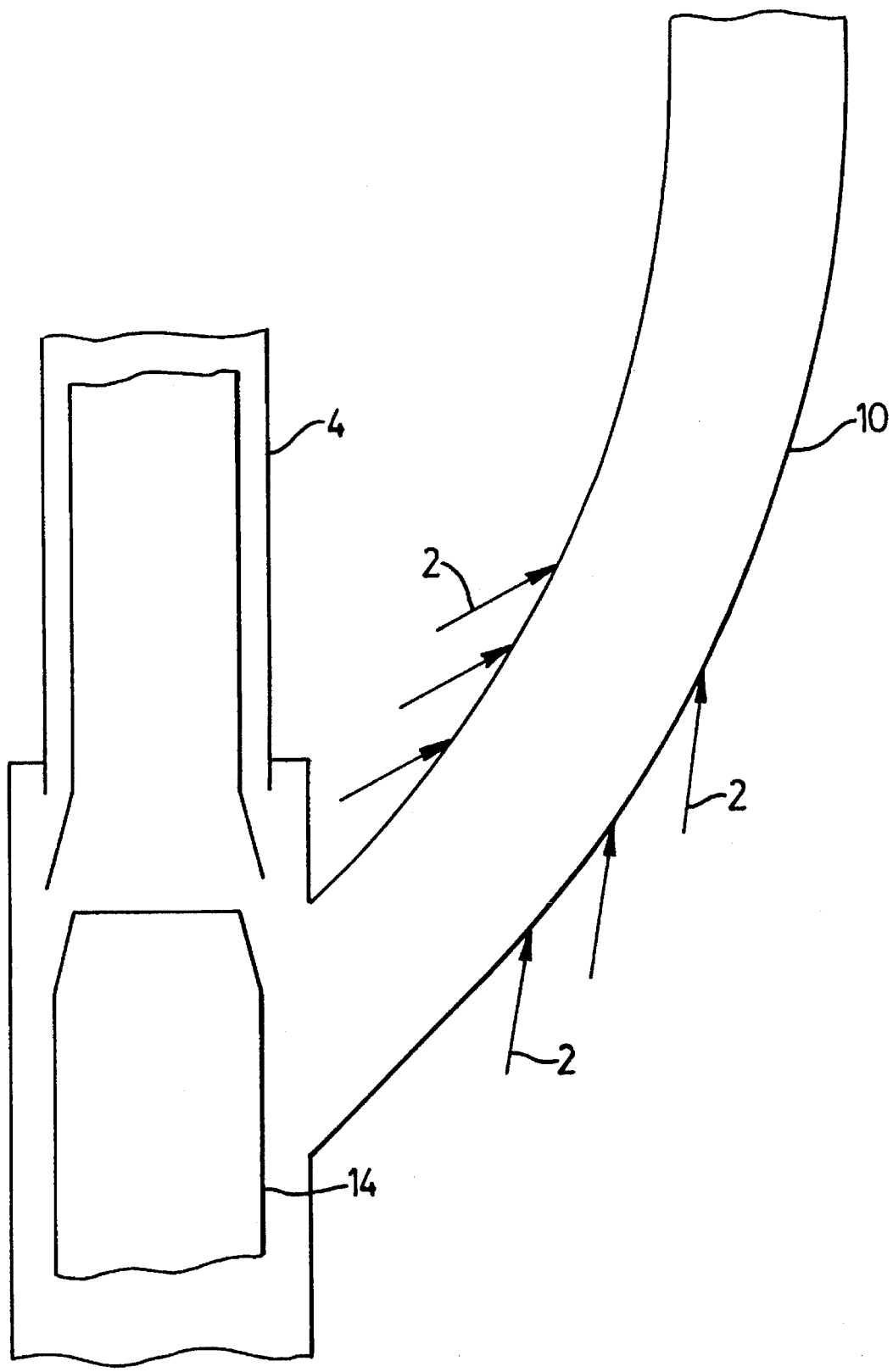

As shown in FIGS. 1, 2 and 3 these nozzles 2 may be variously located. In FIG. 1, catalyst from a catalyst standpipe 4 is metered through a slide valve 6, entrained by steam jets from steam injection ports 8, and swept into a riser 10, at either side of which the nozzles 2 are located (see FIG. 1A), inclined in the direction of catalyst movement. In FIG. 2, the catalyst drops vertically from the catalyst standpipe 4 through the slide valve 6, into a lower end of the riser 10 adjacent an end wall 12 in which the nozzles 2 are located (see FIGS. 2A and 2B) in a array. In FIG. 3, the bottom of the standpipe 4 is controlled by a plug valve 14, catalyst passing the valve being entrained into the riser 10 by the nozzles 2, inclined in the direction of catalyst movement at the entrance to the riser.

The nozzles 2 are constructed as disclosed in U.S. Pat. No. 4,728,036, since the applicant has determined that such nozzles are capable of providing the atomizing performance required by the present invention. Other nozzles determined to be capable of comparable performance could of course be utilized. Nozzles constructed in accordance with U.S. Pat. No. 4,592,506 may be capable of such performance, as may other nozzle designs of this type, and this may be determined by empirical tests. The atomization performance required is reduction of feedstock oil to an average particle size substantially less than 30 microns, with the average particle size preferably being less than about 15 microns and preferably less than 10 microns. Tests have shown that nozzles constructed in accordance with U.S. Pat. No. 4,728,036 are capable of reducing typical feedstock oils to an average particle size of 8 microns.

I have also achieved estimated average particle sizes of from 30 down to about 18 microns using another more conventional nozzle design, but only by resorting to feeding the oil at a pressure of 40 atmospheres and a temperature of 325°–375° C.

The oil particle size required is somewhat related to the catalyst particle size. Typical FCC catalysts have in use an average particle size of about 65 microns: thus the oil particles should in a typical case have an average size less than quarter of that of the catalyst particles. This relationship will remain reasonably valid over the likely range of average catalyst particle size, which is unlikely to be much above 100 microns even with fresh catalyst, nor to fall much below 65 microns, due to inability to retain undersized particles in the system.

The nozzles 2 require, besides a supply of feedstock oil, a supply of atomizing gas, which is typically steam or more preferably a hydrogen containing gas such as absorber tail gas, or a mixture of the two, supplied at the pressure to provide a mass flow rate and velocity at the nozzle determined to provide optimum atomization: the actual figures will vary according to the dimensions of the nozzle and the gas utilized, but will typically be in the range of 5–8 atmospheres. Some examples of typical gas flow rates and pressures when utilized with nozzles of particular dimensions may be found in U.S. Pat. No. 4,592,506. Other gases may be utilized for atomization provided that they do not have a deleterious effect upon the FCC process. The nozzles should be directed so as to maximize the likelihood of oil particles impacting on catalyst particles rather than the walls of the riser 10.

Figure 4:
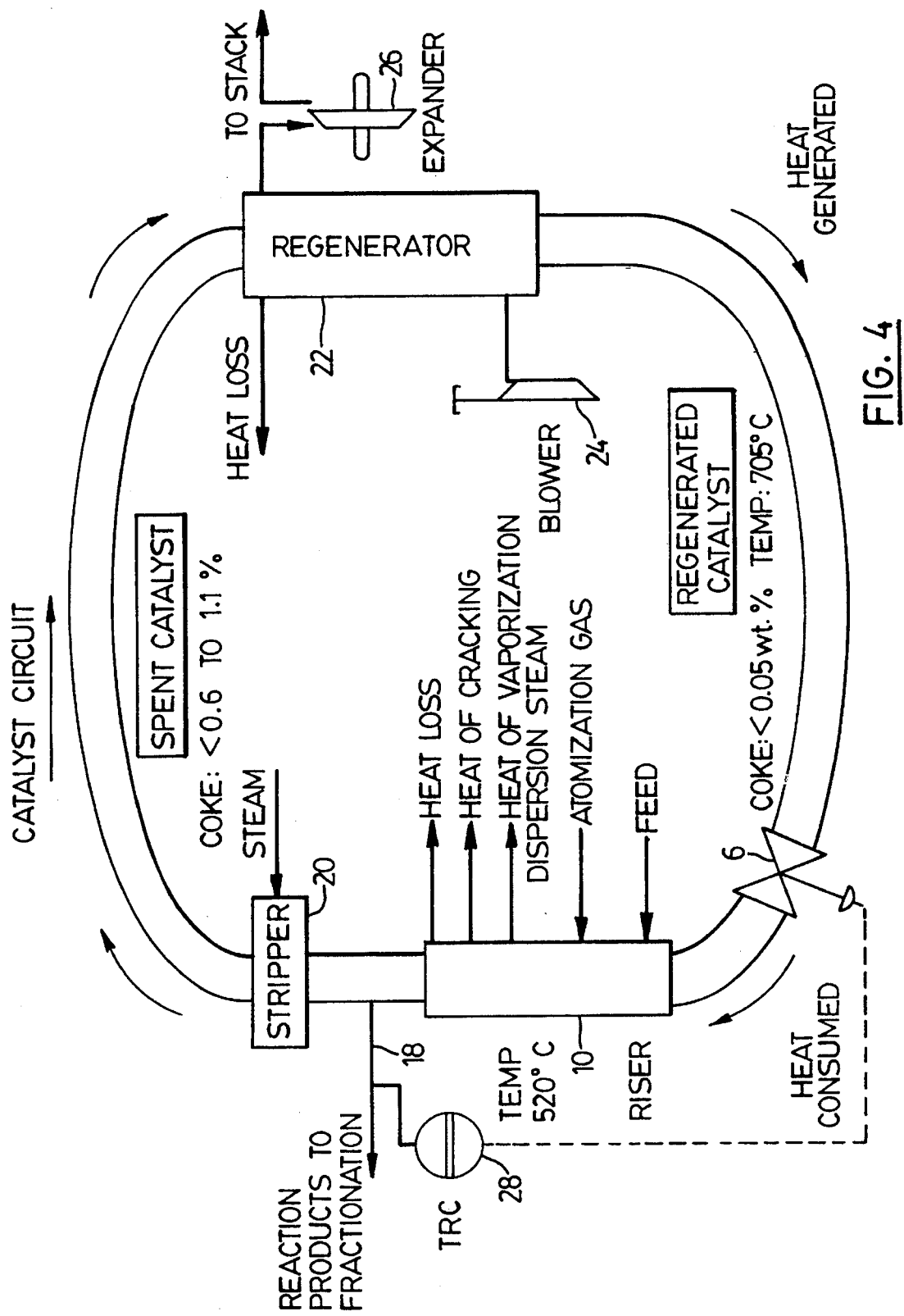
FIG. 4 is a diagram illustrating the heat balance in an FCCU incorporating the invention.

FIG. 4 illustrates catalyst circulation in an FCCU similar to that of FIG. 1; in effect this diagram differs little from that illustrating operation of a conventional FCCU, but features of the invention are discussed further below with reference to it. In addition to the slide valve 6 and riser 10 already mentioned, it shows the separation of reaction products at the top of the riser for passage on line 18 to conventional fractionation stages, a stripper 20 supplied with steam to extract residual hydrocarbons from the spent catalyst, and a catalyst regenerator 22 in which coke is burned from the catalyst to regenerate and reheat the latter. The regenerator is equipped in conventional fashion with a blower 24 and expander 26, and suitable control means 28 are provided for the slide valve 6. The feedstock and atomization gas supplied to the nozzles in the riser are advantageously preheated to minimize the extraction of heat from the catalyst in the riser prior to vaporization of the atomised feedstock.

It is found that the very fine atomization, and consequent very rapid vaporization of the feedstock, in turn causes greatly reduced coke formation on the catalyst which results in enhanced catalyst activity. If riser temperature and feedstock composition remain unchanged, this causes undesirable overcracking of the feedstock, with increased production of low molecular weight fractions at the expense of desired gasoline fractions. Two approaches to these problems can be utilized. Firstly, the riser temperature can be reduced by suitable reduction of the catalyst flow so as to eliminate the overcracking. This however results in a reduction in the octane ratings of the gasoline fractions which is approximately proportional to the temperature decrease required to eliminate overcracking, and which may or may not be acceptable depending upon the output product mix desired. Moreover, a substantial reduction in coke formation affects the heat balance of the process. Heat which would otherwise be generated from combustion of the coke in the regenerator is provided instead by alteration of the cycle conditions until a thermal balance is restored.

In a second approach, material is added to the feedstock which is selected to form coke on the catalyst. Such material may be low volatility oil residues containing a substantial proportion of uncrackable hydrocarbons, such as decant oil and vacuum bottoms. Advantages of this approach are several. Catalyst activity leading to overcracking is reduced, permitting temperature reduction in the riser to be avoided or at least substantially reduced. This minimizes any reduction in octane ratings of the gasoline fractions to be obtained. Valuable fractions are recovered from the added residues, and coke formation at a level necessary to achieve a desirable heat balance can be maintained without such coke being derived from the primary feedstock; instead the added residues are thermally dehydrogenated to provide a desirable level of coke formation.

If the residue used is decant oil, the whole of the decant oil resulting from fractionation of the output of the FCC process can generally be recycled into the feedstock. Decant oil contains a large proportion of uncrackable molecules which will dehydrogenate upon their second pass through the riser. By this means the production of relatively low value decant oil is substantially eliminated, and riser temperature can be increased to or near the levels utilized with conventional dispersion of the feedstock oil.

An alternative residue which can be used is vacuum tower bottoms, provided that such a residue is selected after analysis to establish that it contains substantial quantities of crackable as well as uncrackable molecules. Such residues are usually blended with more valuable fractions such as LCO or distillate to produce bunker fuel, whereas their passage through the process of the present invention will recover a portion as gasoline and LCO, and much of the remainder as decant oil useful as bunker fuel, thus increasing the value of the residue utilized, and releasing distillate or LCO for other applications.

The temperatures shown in FIG. 4 assume that a conventional FCCU is modified by substitution of nozzles 2 as described above for conventional feedstock dispersion means, that decant oil is recycled, but that the feedstock is otherwise unchanged. In the particular example considered, riser temperature decrease by about 8° C. to 520° C., leading to an octane loss of about 1.0–1.5 RON and 0.5 MON in the gasoline fraction, whilst the temperature of the regenerated catalyst is also reduced by about 10° C. to about 705° C.

Tests in an actual FCCU of conventional construction, after installation of an earlier nozzle system, operated so as to provide average particle size of about 18 microns, and under the above conditions, showed a reduction in volume of gas and $C_3/C_4$ fractions of nearly 4% by volume, an increase in yield of gasoline and LCO of nearly 6% by volume, and a decrease in decant oil production of approaching 2½% by volume, when coke production was maintained unchanged. The decant oil was used as a source of coke.

Thus a substantial increase in gasoline and LCO yields was obtained at the expense of gas and less valuable liquids. Even allowing for the reduced octane number of the gasoline fraction obtained a substantial net economic benefit is available in terms of output product value per barrel of feedstock.

Operation without the use of decant oil or other residues to provide coke formation may also be advantageous where a reduction in gasoline fraction octane number is acceptable, since there will again be an increase in the yield of valuable fractions at the expense of less valuable fractions. With the reduced coke formation, catalyst life should be extended.

It is assumed for the purposes of exemplification that a conventional FCCU catalyst is utilized having a mean particle size of about 65 microns: such catalysts may initially have an average particle size of about 100 microns, but the particles are eroded during use until they reach a size such that they can no longer be retained in the system, producing the above effective mean particle size of about 65 microns.

The process of heating the oil and vaporizing it is a time dependent and temperature dependent process. All of the thermal properties of the catalyst and particularly the oil vary significantly with temperature. In evaluating the energy dynamics of such a process the first step is to determine the nature of the process involved. It can be shown that the predominant heat transfer process will be conduction.

It has not been possible to solve the time dependent unsteady state conduction problem presented by a catalyst particle covered by a thin film of oil. However, it is possible to examine the problem by making simplifying assumptions, bearing in mind that this will provide an indication of magnitude differences, rather than exact solutions.

If we assume that the catalyst is at a constant temperature (i.e. its initial temperature) and that the process is not time dependent, it is possible to examine the effect of film thickness on heat transfer rate $q_r$.

Specifically:

$$q_r = -kA \frac{dT}{dr}$$

where $A = \text{area} = 4\pi r^2$, T is temperature, r is particle diameter, and k is a constant. Substituting:

$$q_r = -k(4\pi r^2)\frac{dT}{dr}$$

Rearranging terms:

$$q_r \frac{dr}{r^2} = -k4\pi dT$$

Let $r_i$ = catalyst particle radius
$r_o$ = catalyst+oil particle radius
$T_i$ = temp. at catalyst surface
$T_o$ = temp. at outside oil surface
Integrating both sides:

$$q_r \int_{r_i}^{r_o} \frac{dr}{r^2} = -4\pi k \int_{T_i}^{T_o} dT$$

$$q_r \left[ -\frac{i}{r} \right]_{r_i}^{r_o} = -4\pi k [T]_{T_i}^{T_o}$$

evaluated at limits of each $$\therefore -q_r \left( +\frac{1}{r_o} - \frac{1}{r_i} \right) = -4\pi k (T_i - T_o)$$

$$-q_r \left( \frac{r_i}{r_o r_i} - \frac{r_o}{r_o r_i} \right) = -4\pi k (T_i - T_o)$$

$$-q_r \left( \frac{r_i - r_o}{r_o r_i} \right) = -4\pi k (T_i - T_o)$$

$$q_r \left( \frac{r_o - r_i}{r_o r_i} \right) = -4\pi k (T_i - T_o)$$

$$q_r = -\left( \frac{r_o r_i}{r_o - r_i} \right) 4\pi k (T_i - T_o)$$

When $d_o$=30 microns (=oil particle diameter)
then f=2.0639 microns (=film thickness)
Assuming $d_c$=65 microns (=catalyst particle diameter)
then $r_o$=$d_c$/2=32.5 microns $r_i$=$r_o$+f=34.5639 microns $$\left( \frac{r_o r_i}{r_o - r_i} \right) = 544.3$$

At $d_o$=15 microns
f=0.2652 microns
$d_c$=65 microns $$\left( \frac{r_o r_i}{r_o - r_i} \right) = 4015.3$$

the ratio of qr at 15 micron oil particle diameter to qr at 30 micron oil particle diameter is:

$$\frac{4015.3}{544.3} = 7.38$$

In other words, reducing the oil particle diameter by a factor of 2 from 30 microns to 15 microns will increase the heat transfer rate ($q_r$) by a factor of nearly 8. This is due to the fact that the film thickness is a function of the third power of the oil particle diameter.

The concept of the boundary layer is usually applied when there is fluid movement and heat transfer is governed by convection. In the case of an oil covered particle in a FCCU both conductive and convective processes needed to be considered.

The oil particles in a typical FCCU move at about 100 ft./sec., while the catalyst particles move at about 2–5 ft./sec. The oil effectively catches up to the catalyst and begins enveloping it. The oil will not move past the catalyst since the momentum of the oil is slightly less than the momentum of the denser catalyst. In other words, they will combine to form a single system.

Convective heat transfer is an exponential relationship, that is, temperature increases/decreases exponentially with distance. The outside oil temperature is defined as $T_{oo}$ for simplicity. The boundary layer thickness is defined as the thickness of fluid within which 99% of the temperature change has been accomplished, or the temperature is within 1% of $T_{oo}$.

Conduction heat transfer is governed primarily by the error function. The error function behaves in a manner similar to the exponential function, being steeper towards the interface (i.e. greater temperature change over same distance, when compared to an exponential function) thus creating an analogous boundary layer effect.

In an oil covered catalyst particle, oil outside the boundary layer is effectively not being heated unless fluid motion (convection) carries it to the surface of the catalyst. The oil within the boundary layer will be heated and begin to vaporize. The gas will either move into the catalyst or escape from the catalyst. The oil outside the boundary layer will then move nearer the surface of the catalyst. However, the catalyst temperature has now been reduced, which means the next layer of oil coming into contact with the catalyst will now take longer to vaporize. This process will continue until all of the oil has vaporized. This means that progressively cooler catalyst is subjected to liquid/catalyst contact increasing the opportunity for thermal reactions (i.e. coke production) to occur.

For an oil film thickness less than the boundary layer, all of the oil is subject to rapid heating (i.e. high temperature gradients). There is no need for oil from outside the boundary layer to make its way to the catalyst surface. My boundary layer calculations yielded a boundary layer thickness of around 0.2652 microns at an oil particle size of about 15 microns, depending on the exact operating conditions and thermal properties of the oil.

From previous calculations, the film thickness (=boundary layer thickness) at 15 microns was 0.2652. This can be compared to the film thickness for a 30 micron oil particle of 2.0639 microns, or roughly 8 times the thickness of the boundary layer. The crossover point where the boundary layer thickness equals the film thickness is at about 12–18 microns oil particle diameter.

The embodiments of the invention in which an exclusive property or privilege is claimed are defined as follows:

1. In a fluid catalytic cracking process in which a feedstock oil is dispersed into contact with heated catalyst particles in a riser, the improvement wherein the oil is atomized, by directing a high velocity flow of gas into and through a divergent annular passage surrounding a frustoconical surface with the feedstock oil being flowed in a divergent film over the frustoconical surface, to provide an average oil particle size which is below about 15 microns, the average particle size of the catalyst particles being less than about 100 microns, and the relationship of the oil and catalyst particle average sizes being such that most oil particles contacting a catalyst particle will form a film having a thickness less than about 0.2652 microns.

2. A fluid catalytic cracking process according to claim 1, wherein the average particle size of the atomized oil particles is less than 10 microns.

3. A fluid catalytic cracking process according to claim 1, wherein the average particle size of the catalyst is about 65 microns.

4. A fluid catalytic cracking process according to claim 1, wherein a riser temperature is required to provide gasoline fractions having desired octane numbers which riser temperature would result in overcracking of the feedstock oil, and decant oil recovered from the process is blended with the feedstock oil to provide a content of low volatility substantially uncrackable hydrocarbons in the feedstock sufficient to reduce said overcracking of the feedstock oil.

5. A fluid catalytic cracking process according to claim 1, wherein a riser temperature is required to provide gasoline fractions having desired octane numbers which riser temperature would result in overcracking of the feedstock oil, and oil residues having a substantial content of both crackable and substantially uncrackable hydrocarbons are blended with the feedstock oil to provide a content of low volatility substantially uncrackable hydrocarbons in the feedstock sufficient to reduce said overcracking of the feedstock oil.

6. In a fluid catalytic cracking process in which a feedstock oil is dispersed into contact with heated catalyst particles in a riser, the improvement wherein the feedstock oil is atomized to provide an average oil particle size relative to an average particle size of the catalyst such that most oil particles contacting a catalyst particle will form a film having a calculated thickness below a calculated boundary layer thickness of about 0.2652 microns.

7. A fluid catalytic cracking process according to claim 6, wherein the average catalyst particle size is about 65 microns, and the average feedstock oil particle size is below about 15 microns.

8. A fluid catalytic cracking process according to claim 6, wherein the oil is atomized by directing a high velocity flow of gas into and through a divergent annular passage surrounding a frustoconical surface, the feedstock oil being flowed in a divergent film over the frustoconical surface.

9. A fluid catalytic cracking process according to claim 6, wherein a riser temperature is required to provide gasoline fractions having desired octane numbers, which riser temperature would result in overcracking of the feedstock oil, and decant oil recovered from the process is blended with the feedstock oil to provide a content of low volatility substantially uncrackable hydrocarbons in the feedstocks sufficient to reduce said overcracking of the feedstock oil.

10. A fluid catalytic cracking process according to claim 6, wherein a riser temperature is required to provide gasoline fractions having desired octane numbers, which riser temperature would result in overcracking of the feedstock oil, and oil residues having the substantial content of both crackable and substantially uncrackable hydrocarbons are blended with the feedstock oil to provide a content of low volatility substantially uncrackable hydrocarbons in the feedstock oil sufficient to reduce said overcracking of the feedstock oil.

11. A fluid catalytic cracking process according to claim 6, wherein the gas is a hydrogen containing gas.

12. A fluid catalytic cracking process according to claim 6, wherein the gas is absorber tail gas.

13. In a fluid catalytic cracking process in which a feedstock oil is dispersed into contact with heated catalyst particles in a riser, the improvement wherein the oil is atomized to an average particle size relative to an average particle size of the catalyst particles such that most oil particles contacting a catalyst particle will form a film having a thickness less than a calculated boundary layer thickness of about 0.2652 microns, and wherein oil residues having the substantial content of substantially uncrackable hydrocarbons are blended with the feedstock to provide a content of low volatility substantially uncrackable hydrocarbons in the feedstock oil sufficient to enable riser temperature to be selected to provide gasoline fractions having desired octane numbers with less overcracking of the feedstock than would occur in the absence of the residues.

14. A fluid catalytic cracking process according to claim 13, wherein the oil residues comprise decant oil recovered from the process.

15. A fluid catalytic cracking process according to claim 13, wherein the oil residues have a substantial content of crackable hydrocarbons.

* * * * *